United States Patent
Miyake

(10) Patent No.: US 7,184,081 B1
(45) Date of Patent: Feb. 27, 2007

(54) IMAGE PROCESSING APPARATUS WHICH PREVENTS A PANORAMIC IMAGE OR SEQUENCE OF CONSECUTIVE IMAGES FROM BEING PARTIALLY LOST DUE TO ACCIDENTAL ERASURE THEREOF

(75) Inventor: Izumi Miyake, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/386,848

(22) Filed: Aug. 31, 1999

(30) Foreign Application Priority Data

Sep. 4, 1998 (JP) ............................... 10-251456

(51) Int. Cl.
*H04N 5/76* (2006.01)
(52) U.S. Cl. ................................. 348/231.2
(58) Field of Classification Search ............. 348/231.3, 348/231.6, 231.2, 321.6
See application file for complete search history.

(56) References Cited

U.S. PATENT DOCUMENTS

| | | | | |
|---|---|---|---|---|
| 5,724,579 A * | 3/1998 | Suzuki | ..................... | 707/104.1 |
| 5,726,819 A * | 3/1998 | Kubo | ........................ | 360/57 |
| 5,930,514 A * | 7/1999 | Thompson et al. | ......... | 717/170 |
| 6,249,316 B1 * | 6/2001 | Anderson | .............. | 348/333.05 |
| 6,252,672 B1 * | 6/2001 | Sugawara et al. | ......... | 358/1.15 |
| 6,292,273 B1 * | 9/2001 | Dow et al. | ................... | 358/473 |
| 6,334,025 B1 * | 12/2001 | Yamagami | .................... | 386/96 |
| 6,377,294 B2 * | 4/2002 | Toyofuku et al. | ............. | 348/36 |
| 6,549,232 B1 * | 4/2003 | Taniguchi et al. | ..... | 348/231.99 |
| 6,549,681 B1 * | 4/2003 | Takiguchi et al. | .......... | 382/294 |
| 2001/0048465 A1 * | 12/2001 | Toyofuku et al. | ............. | 348/36 |
| 2003/0193602 A1 * | 10/2003 | Satoh et al. | ........... | 348/333.12 |

FOREIGN PATENT DOCUMENTS

JP          5300463         11/1993

* cited by examiner

*Primary Examiner*—Vivek Srivastava
*Assistant Examiner*—James M. Hannett
(74) *Attorney, Agent, or Firm*—Birch, Stewart, Kolasch & Birch, LLP

(57) ABSTRACT

An image processing apparatus prevents a panoramic image or a sequence of consecutive images from being partially lost due to the accidental erasing of an image composing the panoramic image or the sequence of consecutive images. When the user selects an image to be erased from a memory, additional information about the selected image is read and then it is determined whether or not the selected image is a part of a panoramic image or a sequence of consecutive images with reference to the additional information. If no, the selected image is erased. If yes, a display indicates that the selected image is a part of the panoramic image or the sequence of consecutive images in order to request the user to determine whether to collectively erase all the image data relating to the panoramic image or the sequence of consecutive images including the selected image. Then, all the image data are collectively erased if the user determines so.

5 Claims, 2 Drawing Sheets

IMAGE PROCESSING APPARATUS WHICH PREVENTS A PANORAMIC IMAGE OR SEQUENCE OF CONSECUTIVE IMAGES FROM BEING PARTIALLY LOST DUE TO ACCIDENTAL ERASURE THEREOF

BACKGROUND OF THE INVENTION

1. Field of the Invention

The present invention relates generally to an image processing apparatus, and more particularly to an electronic camera that is capable of performing a panoramic shooting or a consecutive shooting and storing multiple related images.

2. Description of Related Art

In a conventional electronic camera such as a digital camera, each captured image is stored in a memory as one image file. The stored images can be erased on a file-by-file (i.e., image-by-image) basis from the memory.

A well-known electronic camera is capable of performing a panoramic shooting and a consecutive shooting. A row of images are captured to be combined into a panoramic image in the panoramic shooting, and a sequence of consecutive images are captured in the consecutive shooting. Such an electronic camera stores additional information or related information, representing that each image is a part of a panoramic image or a sequence of consecutive images, in a memory, as well as the image at a panoramic shooting or a consecutive shooting.

If the images are allowed to be erased from the memory on a file-by-file basis, however, a user may accidentally erase the image that is a part of the panoramic image or the sequence of consecutive images. If the panoramic image or the sequence of consecutive images is erased partially, a spoiled image (a partially-lost image, an irregular-motion image, or the like) is reproduced, and therefore, all the images relating to the erased image become of no use.

Japanese Patent Provisional Publication No. 5-300463 discloses an electronic camera that uses the related information, but it does not disclose any processing of erasing an image from the memory.

SUMMARY OF THE INVENTION

In view of the foregoing, it is an object of the present invention to provide an image processing apparatus that prevents an image that is a part of multiple related images composing such as a panoramic image or a sequence of consecutive images, from being erased accidentally.

To achieve the above-mentioned object, the present invention is directed to an image processing apparatus, comprising: a memory which stores a plurality of captured images and additional information concerning the images; an image selector which selects an image to be erased among the plurality of images stored in the memory; a determination device which reads the additional information concerning the selected image and determines whether or not the selected image relates to at least one of the plurality of images stored in the memory with reference to the read additional information; and an eraser which erases the selected image from the memory if the determination device determines that the selected image does not relate to any of the plurality of images stored in the memory, and prohibits the selected image from being erased independently if the determination device determines that the selected image relates to at least one of the plurality of images stored in the memory.

According to the present invention, the additional information concerning the selected image to be erased is referred to before the selected image is erased from the memory. If the selected image relates to any other images stored in the memory, the selected image is prohibited from being erased independently. This prevents a part of the panoramic image or the sequence of consecutive images from being accidentally erased by the user.

Preferably, the image processing apparatus further comprises: a display which displays that the selected image is prohibited from being erased independently if the determination device determines that the selected image relates to at least one of the plurality of images stored in the memory; and a decision device which decides whether to collectively erase the selected image and the at least one of the plurality of images relating to the selected image from the memory; wherein the eraser erases the selected image and the at least one of the plurality of images relating to the selected image from the memory if the decision device decides to collectively erase the selected image and the at least one of the plurality of images relating to the selected image.

According to the present invention, if the selected image is prohibited from being erased independently, the display indicates to this effect in order to request the user to determine whether to erase the selected image and all the images relating to the selected image. For example, if the panoramic image or the sequence of consecutive images including the selected image is unnecessary, all the images composing the panoramic image or the sequence of consecutive images can be erased collectively.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
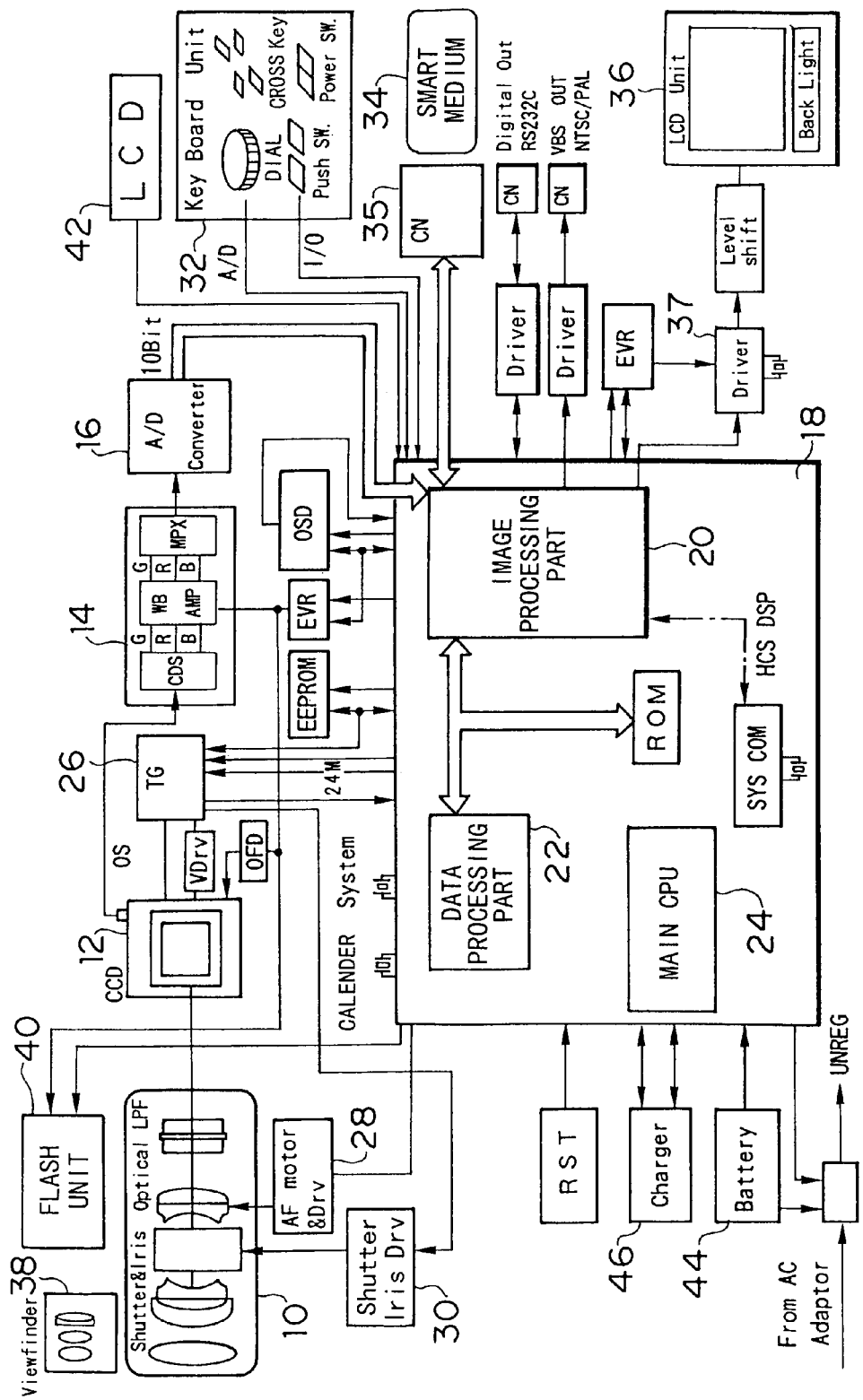
FIG. 1 is a block diagram showing the structure of a digital camera, which is an image processing apparatus according to an embodiment of the present invention.

FIG. 1 is a block diagram showing the structure of a digital camera, which is an image processing apparatus according to an embodiment of the present invention. The digital camera in FIG. 1 has a variety of switches in a keyboard unit 32. When a shutter release switch of the key board unit 32 is pushed, a main CPU 24 of a control unit 18 detects the push of the shutter release switch and sends commands to an autofocus (AF) motor driver 28 and a shutter iris driver 30. Consequently, the AF motor driver 28 controls a focus, and the shutter iris driver 30 performs a photometry and an exposure control. An image light of a subject is formed on a light-receiving surface of a CCD 12 through an optical unit 10. The CCD 12 converts the image light, formed on the light receiving surface, into signal electric charges corresponding to the quantity of the image light. The signal electric charges stored in the CCD 12 are sequentially read as voltage signals (image signals) corresponding to the signal electric charges in accordance with clock pulses transmitted from a trigger generating circuit 26. The image signals outputted from the CCD 12 are sent to an analog processing circuit 14, which performs a white balance adjustment, a gamma correction and the like. An A/D converter 16 converts the image signals, which have been processed at the analog processing circuit 14, into digital signals. Then, the digital signals are sent to an image processing part 20 of the control unit 18.

The digital camera has a viewfinder 38 for use in the image-capturing, a flash unit 40 for emitting a flash light when the subject is in dark, an LCD 42 for displaying the number of available frames to record and the like. A battery 44 supplies each part with electricity. Reference numeral 46 indicates a charger, which charges the battery 44 with the electricity supplied from outside through an AC adapter.

When the image processing part 20 of the control unit 18 receives the image signals, the image processing part 20 converts the image signals into luminance signals Y and chroma signals C (YC signals), and transfers the YC signals to a data processing part 22 of the control unit 18. The data processing part 22 compresses the transferred YC signals, and stores the compressed image data as one image file in a memory or a card-shaped smart medium 34 through the image processing part 20. The smart medium 34 is connected to the image processing part 20 through a connector 35.

Whether the shutter release switch is pushed or not, the image of the subject can be displayed as a real-time raw image on an LCD screen of an LCD unit 36. In this case, the image processing part 20 converts the image signals, which are sequentially transmitted from the A/D converter 16, into the YC signals. The image processing part 20 outputs the YC signals to the LCD unit 36 through a driver 37, etc. without transferring them to the data processing part 22.

To reproduce the images stored in the smart medium 34 on the LCD screen of the LCD unit 36, the data processing part 22 reads the image data from the smart medium 34 through the image processing part 20 and expands and restores the image data to the original YC signals. The restored YC signals are outputted to the LCD unit 36 through the image processing part 20.

The user can select a panoramic shooting mode and a consecutive shooting mode in addition to a normal shooting mode. In the panoramic shooting mode, a row of images are captured to be combined into one panoramic image. In the consecutive shooting mode, one sequence of consecutive images are captured by consecutively capturing multiple images at short intervals.

When the data processing part 22 of the control block 18 stores the compressed image data in the smart medium 34 through the image processing part 20, the data processing part 22 stores additional information about the image as well as the image data in the smart medium. The additional information represents the shooting mode in which the image was captured. With reference to the additional information, it can be easily known that the image is related to any other images, in other words, the image is a part of the panoramic image or the sequence of consecutive images when the image data is read from the smart medium 34.

Before the image data (the image file) is erased from the smart medium 34, it is determined whether to allow the image data to be erased or not with reference to the additional information about the image data, so that a part of the panoramic image or the sequence of consecutive images is prevented from being accidentally erased.

The additional information includes various pieces of information such as shooting date and time, order information and whether the image has been copied, etc. in addition to the shooting mode such as the normal shooting, the panoramic shooting and the consecutive shooting.

A description will now be given of the procedure for erasing the image data (the image file) from the smart medium 34. To erase the image data from the smart medium 34, for example, the user selects an erasing mode by operating a predetermined key of the keyboard unit 32. In the erasing mode, the image data stored in a predetermined image file in the smart medium 34 is read into the data processing part 22 through the image processing part 20, and the compressed image data is restored to the original YC signals. Then, the restored YC signals are outputted to the LCD unit 36 through the image processing part 20, and the image represented by the image data is displayed on the LCD screen. The image on the LCD screen is switched to another image stored in the smart medium 34 by operating, for example, a cross key of the key board unit 32. If the user presses an execution key when an image to be erased is displayed on the LCD screen, the image data is erased from the smart medium 34. If, however, the image is a part of a panoramic image or a sequence of consecutive images as described below, the image is prohibited from being erased independently.

Figure 2:
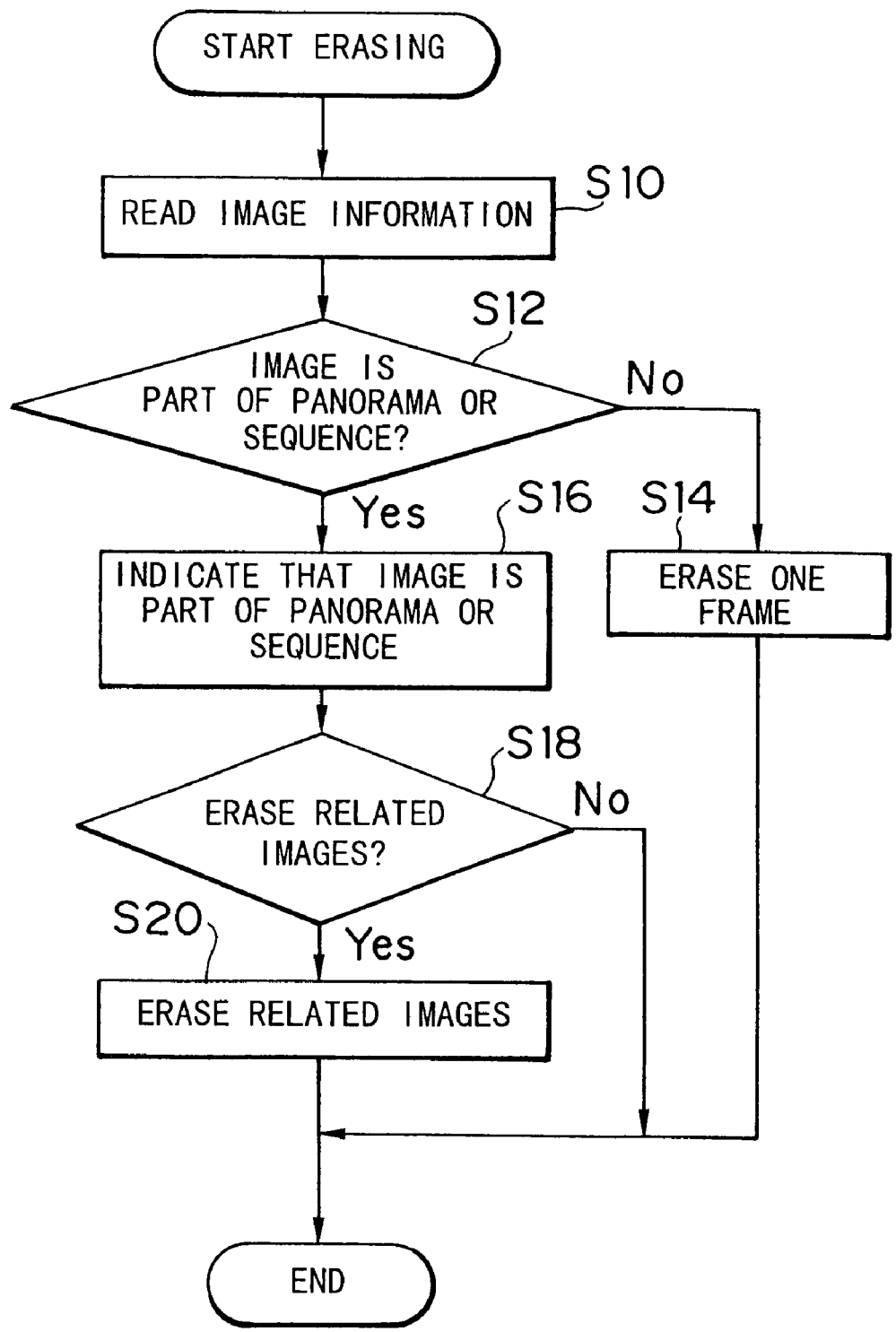
FIG. 2 is a flow chart showing the procedure for erasing image data.

FIG. 2 is a flow chart showing the procedure for erasing the image data. Upon selection of the erasing mode, the main CPU 24 reads the image data into the data processing part 22, displays the image on the LCD screen and reads the additional information about the image data from the smart medium 34 (S10). If the image is selected to be erased by operating the execution key, it is determined whether the image data that is a subject of the erasing is a part of a panoramic image or a sequence of consecutive images with reference to the additional information (S12). If no, the image data of one frame is allowed to be erased, and the image data is erased from the smart medium 34 (S14). If yes, the LCD screen of the LCD unit 36 indicates that the image selected to be erased is a part of the panoramic image or the sequence of consecutive images (S16). The LCD screen also displays a screen for requesting the user to determine whether to collectively erase all the image data related to the panoramic image or the sequence of consecutive images in which the image selected to be erased is included (S18). If no, the processing is finished without erasing the image data. If yes, all the images relating to the image that is firstly designated to be erased are erased (S20) in accordance with the additional information. That completes the erasing of the image data.

Thus, the image data that is a part of a panoramic image or a sequence of consecutive images is prohibited from being erased independently, and this prevents the display of a partially-lost panoramic image or sequence of consecutive images. Moreover, the image data relating to the panoramic image or the sequence of consecutive images can be erased collectively.

In this embodiment, if the image data to be erased is a part of a panoramic image or a sequence of consecutive images, the image data is prohibited from being erased independently and the related image data can be erased collectively. The present invention, however, should not be restricted to this. The erasing of the image data related to other image data may be prohibited and the related image data may be erased collectively. For example, the shooting date and time are recorded as the additional information, so that the image data obtained on the same shooting date are prohibited from being erased independently and they can only be erased collectively.

When image data is erased, whether an image to be erased is a part of the panoramic image or a sequence of consecutive images or not may be determined according to the additional information such as the shooting date and time other than the additional information representing the shooting mode.

In this embodiment, an electronic camera, which captures images, serves as the image processing apparatus that reproduces and erases the captured images. The present invention, however, should not be restricted to this. The image processing apparatus of the present invention includes an image reproducing apparatus, a computer, etc. that receives image data captured by an electronic camera and has image reproducing and erasing functions.

As set forth hereinabove, according to the image processing apparatus of the present invention, the additional information about the image to be erased is referred to when the image is erased from the storage medium. If any other images are related to the image to be erased, the image is prohibited from being erased independently. Therefore, a part of the panoramic image or the sequence of consecutive images can be prevented from being accidentally erased by the user.

If the image to be erased is prohibited from being erased independently, the display on the screen informs the user of the prohibition and requests the user to determine whether to erase all the images related to the image that is the subject of the erasing. Therefore, if the panoramic image or the sequence of consecutive images including the image to be erased is unnecessary, the panoramic image or the sequence of consecutive images can be erased entirely.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing apparatus, comprising:
   a memory which stores a plurality of captured images and additional information concerning the images the additional information including the shooting mode in which the image was captured;
   an image selector which selects an image to be erased from the plurality of images stored in the memory;
   a determination device which reads the additional information concerning the selected image to be erased and determines whether or not the selected image to be erased relates to at least one of the plurality of images stored in the memory with reference to the read additional information;
   an eraser which erases the selected image to be erased from the memory if the determination device determines that the selected image to be erased does not relate to any of the plurality of images stored in the memory, and prohibits the selected image to be erased from actually being erased independently if the determination device determines that the selected image to be erased relates to at least one of the plurality of images stored in the memory;
   a display which displays that the selected image to be erased is prohibited from being erased independently if the determination device determines that the selected image to be erased relates to at least one of the plurality of images stored in the memory; and
   a selection device in which a user selects, after displaying that a selected image is prohibited from being erased since the selected image relates to at least one of the plurality of images, collectively erasing the selected image and the images related to the selected image or not erasing all images related to the selected image,
   wherein the eraser erases the selected image and all the images relating to the selected image from the memory if the selection device decides to collectively erase the selected image and all the images relating to the selected image, and
   wherein the additional information represents whether or not the image concerning the additional information is a part of a panoramic image composed of at least two of the plurality of the captured images stored in the memory.

2. An image processing apparatus, comprising:
   a memory which stores a plurality of captured images and additional information concerning the images, the additional information including the shooting mode in which the image was captured;
   an image selector which selects an image to be erased from the plurality of images stored in the memory;
   a determination device which reads the additional information concerning the selected image to be erased and determines whether or not the selected image to be erased relates to at least one of the plurality of images stored in the memory with reference to the read additional information;
   an eraser which erases the selected image to be erased from the memory if the determination device determines that the selected image to be erased does not relate to any of the plurality of images stored in the memory, and prohibits the selected image to be erased from actually being erased independently if the determination device determines that the selected image to be erased relates to at least one of the plurality of images stored in the memory;
   a display which displays that the selected image to be erased is prohibited from being erased independently if the determination device determines that the selected image to be erased relates to at least one of the plurality of images stored in the memory; and
   a selection device in which a user selects, after displaying that a selected image is prohibited from being erased since the selected image relates to at least one of the plurality of images, collectively erasing the selected image and the images related to the selected image or not erasing all images related to the selected image,
   wherein the eraser erases the selected image and all the images relating to the selected image from the memory if the selection device decides to collectively erase the selected image and the all the images relating to the selected image, and
   wherein the additional information represents whether or not the image concerning the additional information is a part of a sequence of at least two of the plurality of the images stored in the memory that were consecutively captured.

3. The image processing apparatus as defined in claim 1, wherein the image processing apparatus is an electronic camera capturing the images.

4. A method for erasing an image from a memory, comprising the steps of:
   selecting the image to be erased from a plurality of captured images stored in the memory;

reading an additional information concerning the image selected in the selecting step, the additional information including the shooting mode in which the image was captured;

determining whether or not the selected image to be erased relates to at least one of the plurality of images stored in the memory with reference to the additional information read in the reading step;

erasing the selected image from the memory if it is determined that the selected image does not relate to any of the plurality of images stored in the memory in the determining step;

prohibiting the selected image to be erased from actually being erased independently if it is determined that the selected images to be erased relates to at least one of the plurality of images stored in the memory in the determining step;

if it is determined that the selected image to be erased relates to at least one of the plurality of images stored in the memory in the determining step, displaying that the selected image to be erased is prohibited from being erased independently, and selecting by a user whether to collectively erase the selected image and all images relating to the selected image to be erased from the memory or not erase all images related to the selected image; and erasing the selected image and all the images relating to the selected image from the memory if it is selected to collectively erase the selected image and all the images relating to the selected image from the memory in the deciding step, wherein the additional information represents whether or not the image concerning the additional information is a part of a panoramic image composed of at least two of the plurality of the captured images stored in the memory.

5. A method for erasing an image from a memory, comprising the steps of:

selecting the image to be erased from a plurality of captured images stored in the memory;

reading an additional information concerning the image selected in the selecting step, the additional information including the shooting mode in which the image was captured;

determining whether or not the selected image to be erased relates to at least one of the plurality of images stored in the memory with reference to the additional information read in the reading step;

erasing the selected image from the memory if it is determined that the selected image does not relate to any of the plurality of images stored in the memory in the determining step;

prohibiting the selected image to be erased from actually being erased independently if it is determined that the selected images to be erased relates to at least one of the plurality of images stored in the memory in the determining step;

if it is determined that the image to be erased relates to at least one of the plurality of images stored in the memory in the determining step, displaying that the selected image to be erased is prohibited from being erased independently, and selecting by a user whether to collectively erase the selected image and all images relating to the selected image to be erased from the memory or not erase all images related to the selected image; and erasing the selected image and all the images relating to the selected image from the memory if it is selected to collectively erase the selected image and all the images relating to the selected image from the memory in the deciding step, wherein the additional information represents whether or not the image concerning the additional information is a part of a sequence of at least two of the plurality of the images stored in the memory that were consecutively captured.

* * * * *